United States Patent [19]

Morita et al.

[11] 4,199,230
[45] Apr. 22, 1980

[54] ELECTROCHROMIC DISPLAY DEVICE

[75] Inventors: Hiroshi Morita, Machida; Tadao Miura, Yokohama; Hiroshi Washida, Kawasaki, all of Japan

[73] Assignee: Tokyo Shibaura Electric Co., Ltd., Kawasaki, Japan

[21] Appl. No.: 904,301

[22] Filed: May 9, 1978

[30] Foreign Application Priority Data

May 11, 1977 [JP] Japan ............... 52-54065

[51] Int. Cl.² .................................... G02F 1/17
[52] U.S. Cl. ............................................. 350/357
[58] Field of Search ................................. 350/357

[56] References Cited
U.S. PATENT DOCUMENTS

| | | | |
|---|---|---|---|
| 3,708,220 | 1/1973 | Meyers et al. | 350/357 |
| 3,836,229 | 9/1974 | Saurer | 350/357 |
| 3,981,560 | 9/1976 | Heyman et al. | 350/357 |

FOREIGN PATENT DOCUMENTS 2638491 3/1977 Fed. Rep. of Germany ............ 350/357
2618079 6/1977 Fed. Rep. of Germany ............ 350/357

OTHER PUBLICATIONS

I. F. Chang, "Electrochromic and Electrochemichromic Materials and Phenomena", *Nonemissive Electrooptic Displays*, A. R. Kmetz and F. K. von Willisen (Editors), Plenum Press, New York (1975), pp. 155–158.

*Primary Examiner*—James W. Davie
*Attorney, Agent, or Firm*—Cushman, Darby & Cushman

[57] ABSTRACT

An electrochromic display device comprising a first electrode composed of a substrate and a patterned conductive film formed thereon, an electrochromic material layer formed to cover the entire surface of the conductive film, a counter electrode disposed a predetermined distance apart from the first electrode, and an electrolyte disposed between these two electrodes.

5 Claims, 7 Drawing Figures

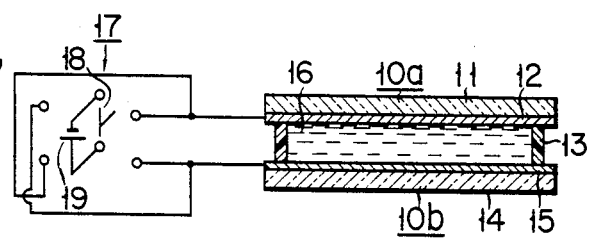
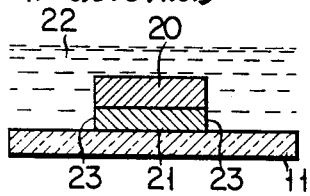
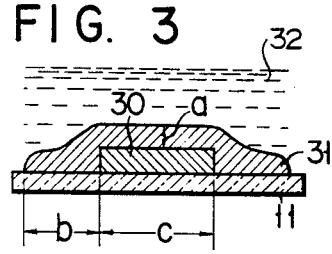
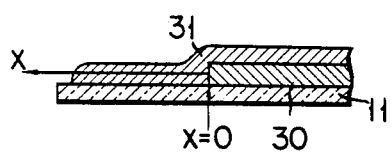
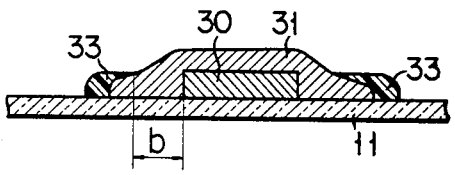
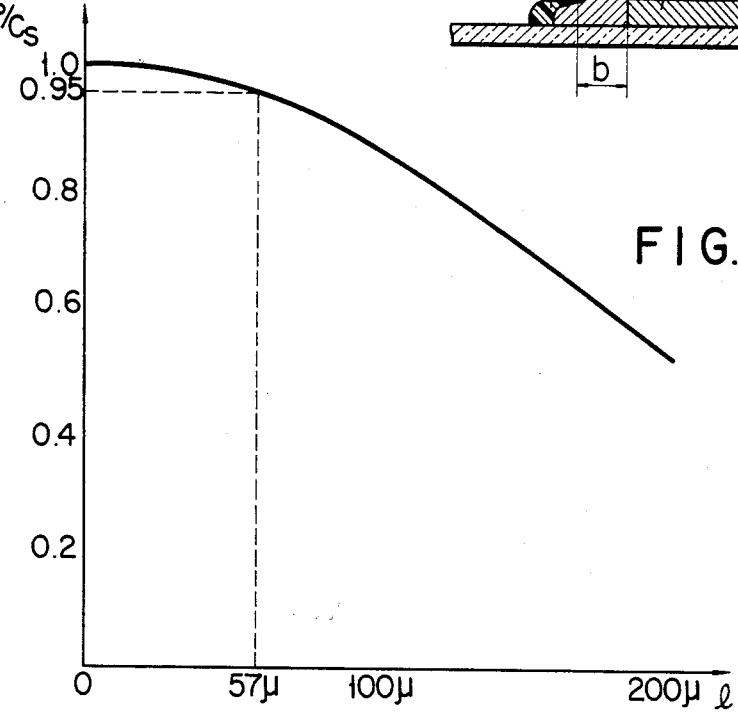

ELECTROCHROMIC DISPLAY DEVICE

This invention relates to an improvement of a display device utilizing electrochromic phenomenon.

Certain substances are colored if electric current flows therethrough and the coloring of this fashion is called the "electrochromic phenomenon." On the other hand, the substance exhibiting the electrochromic phenomenon is called the "electrochromic material." This coloring is bleached by the flow of current in the reverse direction. In general, the electrochromic phenomenon is thought to accompany the formation of color centers or the oxidation-reduction reaction.

There are organic and inorganic electrochromic materials. U.S. Pat. No. 3,806,229 discloses a viologen salt as a typical organic electrochromic material. Also, U.S. Pat. No. 3,712,710 teaches oxides of transition metals such as tungsten oxide and molybdenum oxide as typical examples of inorganic electrochromic materials. In general, these metal oxides are used in combination with electrolytes such as sulfuric acid, phosphoric acid and lithium perchlorate solution.

Recently, an application of the electrochromic phenomenon to a display cell is widely attempted in this technical field. Appended FIG. 1 shows the typical construction of such a display cell. It is seen that a coloring region 16 comprising an electrochromic layer and an electrolyte is formed between a pair of electrodes 10a and 10b. The electrode 10a is prepared by depositing a transparent conductive film 12 on a transparent substrate 11 formed of a glass plate or the like. The conductive film 12 is patterned to denote numerals, letters, symbols, etc. Likewise, the counter electrode 10b is prepared by coating a substrate 14 with a conductive film 15. In FIG. 1, reference numeral 13 denotes a spacer formed of an insulating material. The voltage of a battery 19 is reversibly applied between the electrodes 10a and 10b by actuating a switch 18 of a power source device 17 so as to cause coloration and bleach selectively. Where the substrate 14 and the conductive film 15 of the counter electrode 10b are formed of transparent materials, the display cell is of a transmission type. If opaque materials are used for forming the counter electrode, or a colored background material is mounted within the electrolyte, the display cell is of a reflection type.

Materials suitable for forming the transparent conductive film include indium oxide, tin oxide, etc. On the other hand, a conductive film of stainless steel, tantalum, platinum, etc. is used in the counter electrode of reflection type. In general, an electrochromic material absorbs the ambient light so as to perform a so-called "passive display" which depends on the color density. Thus, the eyes of the viewer do not get tired and the displayed letters, etc. can be seen satisfactorily regardless of the visual angle. In addition, the color once displayed does not disappear even if the display cell has been switched off; namely, the display cell performs the function of a memory device. Because of these advantages, applications to various fields are expected of the electrochromic display device.

However, the conventional display cell is not satisfactory in durability. Specifically, the transparent conductive film tends to erode or peel off at the edge portion in the course of repeated uses of the cell. FIG. 2 is intended to explain the cause of the problem. As shown in the drawing, a solid electrochromic material layer 20 of tungsten oxide, titanium oxide, molybdenum oxide, etc. is formed on a transparent conductive film 21. It is seen that the side face of the conductive film 21 is in direct contact with an electrolyte solution 22, though the upper surface thereof is covered with the electrochromic layer. Under this state, both the transparent conductive film 21 and the electrochromic material layer 20 formed thereon tend to erode or peel off, leading to a short life of the cell. Incidentally, reference numeral 11 of FIG. 2 denotes a substrate which is the same as the substrate 11 of FIG. 1.

The eroding problem is caused by the direct contact of the conductive film 21 with the electrolyte solution 22 as explained below. Namely, in the device of FIG. 2, the electrochromic phenomenon is thought to be caused by the oxidation-reduction reaction between the electrolyte and the electrochromic material. Specifically, a hydrogen ion supplied from the electrolyte is introduced into the electrochromic material and combines with an electron injected from the conductive film into the electrochromic material, resulting in coloration. In this case, the hydrogen ion, particularly, the hydrogen ion under nascent state which is generated during the conducting time exhibits such a strong reducing power that the transparent conductive film is corroded at the portion which is kept in direct contact with the electrolyte solution. Returning to FIG. 2, the upper surface of the transparent conductive film 21 is covered with the electrochromic material layer 20, but a side face 23 of the film 21 is in direct contact with the electrolyte solution 22. Naturally, corrosion tends to occur at the side face 23, leading to the eroding problem of the film 21 and the layer 20 formed thereon.

An object of this invention is to provide an electrochromic display device of a long life, having a conductive film and an electrochromic material layer formed thereon arranged to exhibit a high resistance to the peeling from a substrate on which the conductive film is formed.

Another object is to provide an electrochromic display device having a new design to prevent the electrochromic display material from delaying in the response partially.

According to this invention, there is provided an electrochromic display device, comprising a first electrode composed of a substrate and a conductive film formed thereon, a counter electrode disposed apart from and in a manner to face the first electrode, an electrolyte filling the clearance between the two electrodes, and an electrochromic material layer formed on the conductive film of the first electrode in a manner to prevent the direct contact between the conductive film and the electrolyte.

In a preferred embodiment of this invention, the horizontal length b of that portion of the electrochromic material layer which extends over one end of the conductive film of the first electrode meets the following equation:

$$a \leq b \leq \sqrt{-4D\tau \ln A}$$

where
- "a" is the thickness of the electrochromic material layer,
- "D" is the electron diffusion coefficient in the electrochromic material layer,
- "τ" is the time during which the human eye is capable of detecting the change of the external light, and "A" is the color density discrimination capacity of the human eye.

In a more preferred embodiment of this invention, a protection layer of an insulating material is formed to cover the marginal portion of the electrochromic material layer.

This invention can be more fully understood from the following detailed description when taken in conjunction with the accompanying drawings, in which:

FIG. 1 shows the overall construction of a conventional electrochromic display device, said construction being common to that of a device according to this invention;

FIG. 2 is an enlarged cross sectional view showing the important portion of a conventional electrochromic display device;

FIG. 3 is an enlarged cross sectional view showing the important portion of a device according to one embodiment of this invention;

FIG. 4 is a partial cross sectional view of a device of this invention, which is used for describing how to determine the suitable horizontal length b of that portion of the electrochromic material layer which extends over one end of the conductive film of the first electrode;

FIG. 5 is a graph showing the relationship between the horizontal length b mentioned above and the color density discrimination capacity of the human eye; and FIGS. 6 and 7 are enlarged cross sectional views each showing the important portion of a device according to another embodiment of this invention.

Figure 7:
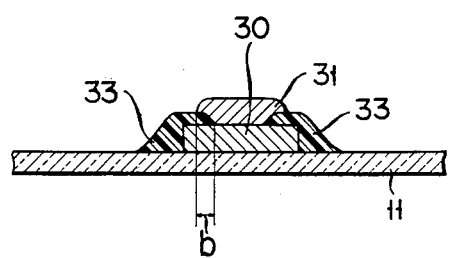

FIG. 3 shows a preferred embodiment of this invention. It is seen that a transparent conductive film 30 of a desired pattern or design, which is made of tin oxide, is formed on a glass substrate 11 so as to provide a first electrode of the electrochromic display device. Further, an electrochromic material layer 31 having a thickness of $0.3\mu$ and made of tungsten oxide is formed to cover the entire surface of the conductive film 30, thereby preventing the conductive film from directly contacting an electrolyte 32 composed of a gel prepared by mixing sulfuric acid subjected in advance to a dehydration treatment and glycerin in a weight ratio of 1:5. The electrochromic display device of this invention is substantially the same as the device shown in FIG. 1 except that the particular construction shown in FIG. 3 is incorporated into the device of FIG. 1. Of course, the substrate 11 shown in FIG. 3 is equal to the substrate 11 of FIG. 1.

Incidentally, the conductive film 15 constituting a part of the counter electrode 10b of FIG. 1 is provided by a tantalum layer formed on the entire surface of the substrate 14 by sputtering method. Further, a tungsten oxide film (not shown) having a thickness of $0.3\mu$ is formed on the entire surface of the tantalum film 15 by vapor deposition method. Still further, a porous sheet of tetrafluoroethylene (not shown) having a pore size of $5\mu$, a porosity of 25% and a thickness of $50\mu$ is disposed between the electrodes 10a and 10b so as to provide a white background to the display device.

In the construction of FIG. 3, the electrochromic material layer 31 serves to prevent perfectly the transparent conductive film 30 from directly contacting the electrolyte 32. It follows that the conductive film is not corroded by the nascent hydrogen ion generated during the conducting time, leading to a marked improvement in the life of the electrochromic display device.

The electrochromic phenomenon can be applied to the medium speed display of a small area as in wrist watches and meters, among various application fields thereof. The above-described construction of this invention produces a particularly prominent effect when applied to such a medium speed display of a small area. In this case, it is important to pay an attention to the coloration property of portion b of the electrochromic material layer 31 shown in FIG. 3, i.e., the portion of the layer 31 horizontally extending from the side face of the conductive material 30.

Specifically, an electrochromic display device exhibits a response speed of about 0.2 sec. as described in, for example, "Electronics Material, March 1976, page 102" in Japanese. This implies that it takes about 0.2 sec. for that portion of the electrochromic material layer 31 which is positioned at portion c of FIG. 3 to color or bleach in response to the switching on or off of the display device. The response speed mentioned is near the lower limit of range suitable for application to the display having a rather quick response as in a wrist watch.

It shoud be noted that if the portion b of the electrochromic material layer 31 is unduly large, the coloration is performed moderately especially at the marginal portions thereof, giving a redundant impression to the viewer. It is generally said that the eye of a human being is capable of catching the charge of the external light occurring during the time exceeding about 1/16 second. It follows that the display device is enabled to overcome the abovenoted difficulty and to perform a vivid display of a desired pattern, if the length of the portion b is determined to permit the coloration or bleach to occur within the abovenoted period of time.

According to "Applied Physics Letters 36, 120 (175)," the diffusion coefficient of electron into, for example, tungsten oxide forming the electrochromic material layer 31 is $0.0025 \pm 0.0006$ cm$^2$/sec. The literature also teches that the coloration or bleach of an electrochromic material depends on the diffusion coefficient of electron in the electrochromic material rather than on the hydrogen ion, where the surface area of the electrochromic material layer is very large relative to the thickness thereof and the layer is in direct contact with an electrolyte as in the portion b shown in FIG. 3. Thus, the allowable maximum length of the portion b can be determined by measuring the diffusion coefficient of electrons in the electrochromic material layer 31 based on a known method.

The electron diffusion can be practically regarded as proceeding in one dimensional direction in cross section of the portion b of FIG. 3. Thus, let us look into the matter in terms of an x-axis with the edge of the transparent conductive film 12 providing the origin and the electron diffusion direction taken as the positive side as shown in FIG. 4. With the electron concentration at the origin (x=0) set at a constant $C_s$, the following differential equation and boundary condition are established:

$$\frac{\delta C}{\delta t} = D \frac{\delta^2 C}{\delta x^2} \qquad (1)$$

where,

"D" is the electron diffusion coefficient,
"t" is the lapse of time, and
"C" is the electron concentration
The initial condition (x=0) is:

$$C(0, t) = C_s \quad (2)$$

The following equation can be obtained from the formulas (1) and (2):

$$C(x, t) = C_s \exp\left(-\frac{x^2}{4Dt}\right) \quad (3)$$

A distance l, incapable of visual recognition, from the origin ($x=0$) at which the electron concentration $C'_s$ is substantially equal to the initial concentration $C_s$ after the critical time of $\tau$ second represents the allowable maximum length of the portion b. In order to obtain the value of l, the equation (3) is converted as follows by substituting l and $\tau$ for x and t, respectively, in the euqation (3):

$$\ln\frac{C'_s}{C_s} = -\frac{l^2}{4D\tau} \quad (4)$$

Thus, l can be expressed as follows:

$$l = \sqrt{-4D\tau \ln\frac{C'_s}{C_s}} \quad (5)$$

In the equation (5), $c'_s/C_s$ denotes the color density discrimination capacity of the human eye. It follows that the portion b of FIG. 3 can be expressed as follows:

$$b \leq \sqrt{-4D\tau \ln A} \quad (6)$$

where, A represents $C'_s/C_s$ of the equation (5).

For protecting satisfactorily the transparent conductive film 12, the portion b should be reasonably range. It is also important to pay attention to influences of pin holes in view of the case where the device is used for displaying minute patterns, etc. Under the circumstances the lower limit of the length of the portion b should be roughly equal to the thickness a, shown in FIG. 3, of the electrochromic material layer 31.

It follows that the following relationship is established with respect to the preferred range of b:

$$a \leq b \leq \sqrt{-4D\tau \ln A} \quad (7)$$

The literature "applied Physics Letters" mentioned previously teaches that the values of D is 0.0025 cm$^2$/sec and $\tau$ is 0.625 sec., as mentioned above. The relationship between l and $C'_s/C_s$ can be obtained by substituting these values of D and $\tau$ in the equation (5) as shown in FIG. 5. In general, the color density discrimination capacity (or, $C'_s/C_s$) of a human eye is 0.95. This indicates that a suitable value of l is 57$\mu$ as shown in FIG. 5. As a matter of fact, an electrochromic display device actually produced with the length of the portion b set at 50$\infty$ was quite satisfactory in the effect of preventing the conductive film 30 from deteriorating. In addition, the device meeting the formula (7) is free from the delay of display at the peripheral portions of the letters, numerals, etc.

If voltage is applied to the display device such that the conductive film 30 shown in FIG. 3 acts as a cathode and the conductive film of the counter electrode as an anode, the hydrogen ion supplied from the electrolyte 32 enters the electrochromic material layer 31 and combines therewith the electron injected from the conductive film 30 so as to cause the layer 31 to color. In this coloration mechanism, the reducing power of the hydrogen ion, particularly, the hydrogen under nascent state generated during the conducting time tends to corrode the conductive film. In this invention, however, the conductive film 30 is not exposed at all to the electrolyte 32 as shown in FIG. 3, resulting in that the side faces of the conductive film 30 are free from the corrosion problem. An additional merit is produced by the construction that the side faces of the conductive film are covered with the electrochromic material layer 31 permitting the passage of the hydrogen ion. Namely, the local injection of the hydrogen ion, which is caused by the concentration of the electric field at the marginal portion of the conductive film, can be alleviated by the particular construction. Naturally, in the construction of FIG. 3, the errosion or peeling off of the conductive film 30 and the electrochromic material layer 31 formed thereon from the substrate 11 hardly occur so that the life of the electrochromic display device is remarkably improved.

The effect of this invention can be enhanced by providing a layer 33 of an electrically insulating material such as silicone varnish in a manner to cover the marginal portions of the electrochromic material layer 31 as shown in FIG. 6. Incidentally, those portions of FIG. 6 which correspond to the portions of FIG. 3 are denoted by the common reference numerals. In this construction, the length b which is that from the boundary of the coverage of the protective insulating material and electrochromic material to the side faces of the conductive film, meet the equation (7). In order to demonstrate the effect of this invention, a comparative test was conducted between a display device of this invention having a construction as shown in FIG. 6 and a conventional device in which a side face 23 of the conductive film 21 is exposed to the electrolyte as shown in FIG. 2. Specifically, voltage pulses were applied to each of those display devices under the same conditions so as to cause the device to color and bleach alternately. The conventional device was found incapable of performing the display function when the color-bleach cycles reached 10$^6$ times. In contrast, the device of this invention exhibited no inconvenience even after the color-bleach cycles exceeded 6×10$^6$ times.

The effect of the invention can also be attained by the following construction.

As shown in FIG. 7, the marginal portions of the patterned conductive film 30 are covered with a protective insulating material 33 such as silicone varnish and further the entire conductive film and the peripheral portions of the insulating material 33 are covered with an electrochromic material 31 such as tungsten oxide. In this construction, the length b which corresponds to that from the boundary of the coverage of the electrochromic material 31 and the insulating material 33 to the boundary of the covering insulating material 33 and the conductive electrode 30, meets the equation 7.

What we claim is:

1. An electrochromic display device, comprising:
    a first electrode composed of a substrate and a conductive film of a desired pattern, said conductive film having a first surface attached to said substrate, a second surface opposite said first surface and side surfaces contiguous with said first and second surfaces;
    a counter electrode disposed apart from the first electrode;

an electrolyte between the two electrodes; and
an electrochromic material layer formed on said conductive film, said electrochromic material covering the entire said second surface of said conductive film and extending beyond said side surfaces of said conductive film so as to prevent said side surfaces from directly contacting said electrolyte, the horizontal length b which said electrochromic material layer extends beyond said side surfaces of the conductive film of said first electrode meeting the following equation:

$$a \leq b \leq \sqrt{-4D\tau \ln A}$$

where,

"a" is the thickness of the electrochromic material layer,

"D" is the electron diffusion coefficient in the electrochromic material layer,

"$\tau$" is the time during which the human eye is capable of catching the change of the external light, and "A" is the color density discrimination capacity of the human eye.

2. The device according to claim 1, wherein the "$\tau$" is 1/16 second and the "A" is 0.95.

3. The device according to claim 1, wherein the device further comprises a protection layer of an insulating material formed to cover the marginal portion of the electrochromic material layer, and the horizontal length b corresponds to the distance from the boundary of the coverage of the insulating material and the electrochromic material to the side faces of the conductive film.

4. The device according to claim 3, wherein the protection layer is formed of silicone varnish.

5. The device according to claim 1, wherein an insulating material covers the marginal portions of the conductive film and an electrochromic material covers the peripheral portions of the insulating material and the conductive film, and horizontal length b corresponds to the distance from the boundary of the coverage of the electrochromic material and the insulating material to the boundary of the covering insulating material and the conductive electrode.

* * * * *